United States Patent [19]
Sumiyoshi et al.

[11] Patent Number: 6,115,037
[45] Date of Patent: Sep. 5, 2000

[54] MOTION IMAGE CONTROL METHOD AND APPARATUS

[75] Inventors: Masanori Sumiyoshi, Kodaira; Hirotada Ueda, Kokubunji, both of Japan

[73] Assignee: Hitachi Denshi Kabushiki Kaisha, Tokyo, Japan

[21] Appl. No.: 08/971,619

[22] Filed: Nov. 17, 1997

[30] Foreign Application Priority Data

Nov. 15, 1996 [JP] Japan ................................. 8-303400
May 16, 1997 [JP] Japan ................................. 9-126891

[51] Int. Cl.⁷ ................................................ G06K 15/00
[52] U.S. Cl. ........................................ 345/328; 345/341
[58] Field of Search ................................ 345/326–358

[56] References Cited

U.S. PATENT DOCUMENTS

| | | | |
|---|---|---|---|
| 5,202,961 | 4/1993 | Mills et al. ................................. | 345/328 |
| 5,388,197 | 2/1995 | Rayner ....................................... | 345/328 |
| 5,467,288 | 11/1995 | Fasciano et al. ........................... | 345/328 |
| 5,682,326 | 10/1997 | Klingler et al. ............................ | 345/328 X |
| 5,828,370 | 10/1998 | Moeller et al. ............................. | 345/328 |
| 5,832,173 | 11/1998 | Terasawa et al. .......................... | 345/328 X |
| 5,861,880 | 1/1999 | Shimizu et al. ............................ | 345/328 X |
| 5,889,514 | 3/1999 | Boezeman et al. ........................ | 345/328 X |

*Primary Examiner*—Steven Sax
*Attorney, Agent, or Firm*—Antonelli, Terry, Stout & Kraus, LLP

[57] ABSTRACT

A motion image control method and apparatus wherein, on a window displayed on a display screen of an image editing device, a slider indicator for implementing a shuttle function at the time of reproducing a motion image is provided with an origin in its mid-point and, when an operator releases a knob indicator located at a given position within a predetermined range, the knob is automatically returned to the origin to put the motion image indicator in its stopped state and, when the operator releases the knob located out of the predetermined range, the knob stays still at the moved position to display the motion image at its set reproduction rate. Further, a predetermined reproduction rate of the motion image is set when the knob is within the predetermined range, whereas, when the knob is moved out of the predetermined range with use of a mouse, the reproduction rate is set at a desired reproduction rate corresponding to a displacement of the knob from the predetermined range.

19 Claims, 13 Drawing Sheets

800: WINDOW
801: SLIDER
802: IMAGE DISPLAY SECTION

800: WINDOW
801: SLIDER
802: IMAGE DISPLAY SECTION

200: SLIDER
201: KNOB
202: LEADING FRAME
203: END FRAME
204: LEFT END
205: RIGHT END

300: SLIDER
301: KNOB
302: ORIGIN

310: HIGH SPEED DISPLAY WINDOW
311: MOVING ICONS
312: FUNCTION BUTTONS
313: EDITING AREA

500: PREVIEW WINDOW
501: SLIDER
502: AUTO RETURN BUTTON
503: IMAGE DISPLAY AREA
504: SCALE
505: PUSH BUTTON SWITCHES
506: KNOB

110: IMAGE DISPLAY WINDOW
111: DISPLAY/REPRODUCTION WINDOW
112, 113, 114: BUTTONS
115: SLIDER
116: REPRODUCTION RATE DISPLAY WINDOW
117: REPRODUCTION RATE CHANGE BUTTON
118: LINKAGE BUTTON
119: ORIGIN RETURN BUTTON
120: SET BUTTON
121: JUMP BUTTON
122: KNOB

123: INITIAL VALUE SET BUTTON
124: INITIAL VALUE DISPLAY WINDOW

125: LIST OF SETTING VALUES

MOTION IMAGE CONTROL METHOD AND APPARATUS

BACKGROUND OF THE INVENTION

The present invention relates to an editing apparatus for use in production of programs such as television broadcasting programs or video programs and more particularly, to a motion image control apparatus and method suitably used in production of motion image programs.

As we quickly enter upon information-oriented society, the functions of a computer used in an apparatus for producing television broadcasting programs and video programs have been made quickly high-level and sophisticated.

In particular, recent program production often uses such a video editing method that video information is recorded on inexpensive hard disk easy to handle and save or on optical disk and an operator edits the saved video information with use of a motion image editing apparatus; though, the program production employed, in the past, such a video editing method that an operator edits video information with use of a video tape recorder by repeating sequences in fast forward and backward or reverse scan by looking to a tape counter.

Though the computer has been used and its functions have been sophisticated, however, the editing operations in the motion image editing apparatus comprising a magnetic recording/reproducing device using such hard disk or optical disk still requires the operator to record motion images, e.g., in the hard disk or to preview and confirm the motion images recorded in the hard disk. The word "preview" means to reproduce a result of video information in the course of editing or after editing is completed on a display screen for confirmation by the operator.

In general, a motion image editing apparatus for editing of video information displays operational and control windows based on software on the screen of a display connected to a system control computer which forms part of the motion image editing apparatus, and an operator operates and controls the motion image editing apparatus on the basis of the displayed operational and control windows.

Displayed, based on software, in the operational and control windows on the display screen are control panels which can have the same functions as slider and pushbutton switch and which can be operated as an alternative to such an input device as a mouse or keyboard acting in response to a combination of key or mouse operations. For example, a rectangular display area (which will be referred to merely as "slider", hereinafter) as an alternative to the slider is further provided therein with a square display zone simulating slider's knob (which will be referred to merely as "knob", hereinafter). When the operator puts a cursor on the displayed knob with use of the mouse connected to the system control computer and clicks (which means to push a pushbutton switch on the mouse) the mouse or moves the mouse while dragging (which means to move the mouse while keeping the mouse pushbutton pushed, for the purpose of moving the position of the cursor-selected figure, etc.); this is equivalent to realize a shuttle function of a dial type, attached to, e.g., a video tape recorder.

FIG. 1 shows, as an example, a configuration of an editing display screen when a piece of motion image editing software being generally used is employed. A similar screen is shown in a reference book entitled "MEDIA SUITE PRO", User's Guide for THE INDIGO (registered) FAMILY, Version 1.0, p. 59, 1994. In the editing screen, a window 800 is used to edit motion image data such as capturing it in an editing system. The window 800 has an image display section 802 in its center area and also has a right-side control panel in which a slider 801 is provided for realizing a function similar to the aforementioned shuttle function.

As generally known, the following shuttle function is known. In the drawings, however, only the slider for realizing the shuttle function is depicted. A similar shuttle function is disclosed in a reference book entitled "Adobe Premiere (registered) User Guide", Version 4.0, 1994, page 122.

The conventional shuttle function is, as shown in FIG. 2, of such a type that all frames of a motion image being edited are made to coincide with a full scale of the slider.

That is, when the operator, using the mouse, drags a knob 201 of a displayed slider 200 to a left end 204 of the slider 200, this specifies a leading frame 202 (also called an IN point) of a file corresponding to the motion image; whereas, the operator drags the knob to a right end 205 of the scale, this specifies a last frame 203 (also called an OUT point) of the file.

This type of slider 200 is designed so that, when the operator releases the knob 201 being dragged to stop the dragging operation, the knob 201 will stay at the knob released position as it is to continuously display all the frames.

In the second type, which the present inventors examined in the process of reaching the present invention and had not been known before the present invention, as shown in FIG. 3, a slider 300 has its origin 302 in the mid-point of the slider 300 or in the vicinity thereof. When a knob 301 is located at the origin position, the reproduction rate of the image becomes zero and the image can be displayed as a still image. In this case, when the knob 301 is moved rightwards the image is reproduced in its forward direction, whereas, when the knob 301 is moved leftwards, the image is reproduced in its opposite direction. Further, the reproduction rate varies depending on an amount of displacement of the knob 301 from the origin 302. In other words, the motion image can be reproduced with the allocated reproduction rate.

For example, assuming that an ordinary reproduction rate is 1, the image is reproduced at a rate corresponding to n times the ordinary rate at the rightmost end of the slider 300, while, the image is backwardly or reversely reproduced at a rate corresponding to n times the ordinary rate at the rightmost end thereof in the opposite direction.

In this second type of shuttle function, when the operator releases the knob 301 at a given position, the knob 301 stays still at the given moved position, and the image is continuously reproduced at the reproduction rate of the stayed position of the knob 301.

In the case of the second type, when it is desired to stop the reproducing operation, the operator is required to return the knob 301 to the origin 302.

As explained above, the shuttle function of the editing system using the piece of motion image editing software for reproduction of the motion image is considered to be divided into several types. However, the shuttle function has problems which follow, when the operator wants to preview the contents of the image in the course of the image editing or after the image editing was completed, to confirm it.

In the case of the first type of shuttle function (refer to FIG. 2), when an image requires a long previewing time, this increases the number of frames to be allocated to the amount of movement in the knob 201. For example, when the operator wants to move the image back by one frame, i.e., this requires the operator to conduct fine adjusting work; the amount of movement in the knob 201 becomes very short, which makes it difficult for the operator to do it and which is also not suitable for reproduction at a constant rate over a long-time, such as slow reproduction or double-speed reproduction.

In the case of the second type of shuttle function (refer to FIG. 3), when it is desired to stop the reproducing operation based on the shuttle function during the reproducing operation of the image at a given reproduction rate, this requires the operator to move the knob 301 to the prigin of the slider. However, it is highly difficult for the operator to surely put the knob 301 on the origin of the slider 300 through a single operation, and it is often the case that the knob 301 is moved left or right excessively.

As mentioned above, when the previewing is carried out using the shuttle function, the first and second types have their merits and demerits. For the slow reproduction and fast reproduction, the first type as shown in FIG. 2 is unsuitable. Further, the second type having no function of automatically returning to the origin as shown in FIG. 3, it is inconvenient when it is desired to display a target frame.

SUMMARY OF THE INVENTION

It is therefore an object of the present invention to provide a motion image control method and apparatus wherein, on an editing window, a slider is provided with an origin at its mid-point or in the vicinity thereof, so that, when a knob is located within a predetermined range extending right and left equally, from the origin, the knob is automatically returned to the origin to set a reproduction rate at zero and to put a motion image in its stopped state; whereas, when the operator releases the knob at a position out of the predetermined range, the knob stays still at its moved position to reproduce the motion image at a reproduction rate set for the position.

Another object of the present invention is to provide a motion image editing apparatus and a motion image controlling method wherein, when an operator releases a knob located at any position, the knob is automatically returned always to an origin.

In accordance with an aspect of the present invention, the above objects are attained by providing a motion image editing apparatus which includes apparatus for recording and reproducing video information including video and voice data, apparatus for editing the video information recorded in the recording/reproducing apparatus with use of a computer, and apparatus for displaying edit information indicative of contents of the video information based computer software of the editing apparatus, and wherein the editing apparatus is operated to display an editing window on the display apparatus, an image display area for display and editing of a motion image reproduced by the recording/reproducing means as well as a control indicator having a knob indicator for selecting a reproduction rate of the motion image of the image display area are displayed on the window, the control indicator has an origin at its mid-point, a first predetermined range extending right and left equally from the origin is set as such a range that the image is reproduced always at a predetermined reproduction rate which has been set, a second range other than the predetermined range is set as such a range that the reproduction rate of the image is set according to a position of the moved knob, so that the motion image is displayed at a desired reproduction rate by moving the knob of the control indicator to a desired position.

More in detail, the reproduction rate of the image is set at zero within the first predetermined range extending right and left equally from the origin of the control (slider) indicator, the origin being located at the mid-point or center of the control indicator, the reproduction rate of the image is set at a desired value that increases with a distance of the knob from the origin in the second range other than the first predetermined, so that, when the operator moves the knob to a position out of the first predetermined range of the control indicator or releases the knob at that point, the knob stays still at the moved position to continue the reproduction of the image at a desired rate set for the distance and, when the operator moves the knob to a position within the first predetermined range of the control indictor or stops it at that position, the knob is automatically returned to the origin at the mid-point of the control indictor to put the image in its stopped or still state.

Preferably, the first predetermined range may be varied. That is, the range may be expanded to the entire slider as necessary, so that, when the operator releases the knob, the knob can be automatically returned always to the origin from any position therein.

Desirably, it may be arranged so that, so long as the operator continues to click the knob with use of a mouse, the image is reproduced at a reproduction rate corresponding to a position of the mouse; whereas, when the operator releases the knob, the knob located at any position within the entire slider is automatically returned to the origin to put the reproduction of the image in the stopped state.

BRIEF DESCRIPTION OF THE DRAWINGS

The above and other objects, features and advantages of the present invention will become apparent from the following detailed description when taken with the accompanying drawings in which.

DESCRIPTION OF THE PREFERRED EMBODIMENTS

Editing apparatuses embodying a motion image controlling method in accordance with the present invention include a recording/reproducing apparatus which has a function of receiving video information (including video and voice) from such a video reproducing device as a video tape recorder for reproduction of the video information recorded in video medium such as video tape, film, video disk, etc., and recording it in such recording medium as magnetic disk or optical disk.

In the recording/reproducing apparatus, such a recording medium as, e.g., a magnetic disk having the video information recorded therein is accessed usually by such operator's instruction device as a mouse or keyboard connected to a system control computer, the video information recorded in the recording medium is read out therefrom, and then displayed on a display screen to be arranged according to a selected editing sequence and to be edited for such special effect as wipe.

In the course of such editing operation, for the purpose of confirming contents of information recorded in the video medium or the contents of a scene during editing or after completion of the editing, the operator reproduces the video and voice of the information usually using the preview function.

Figure 6:
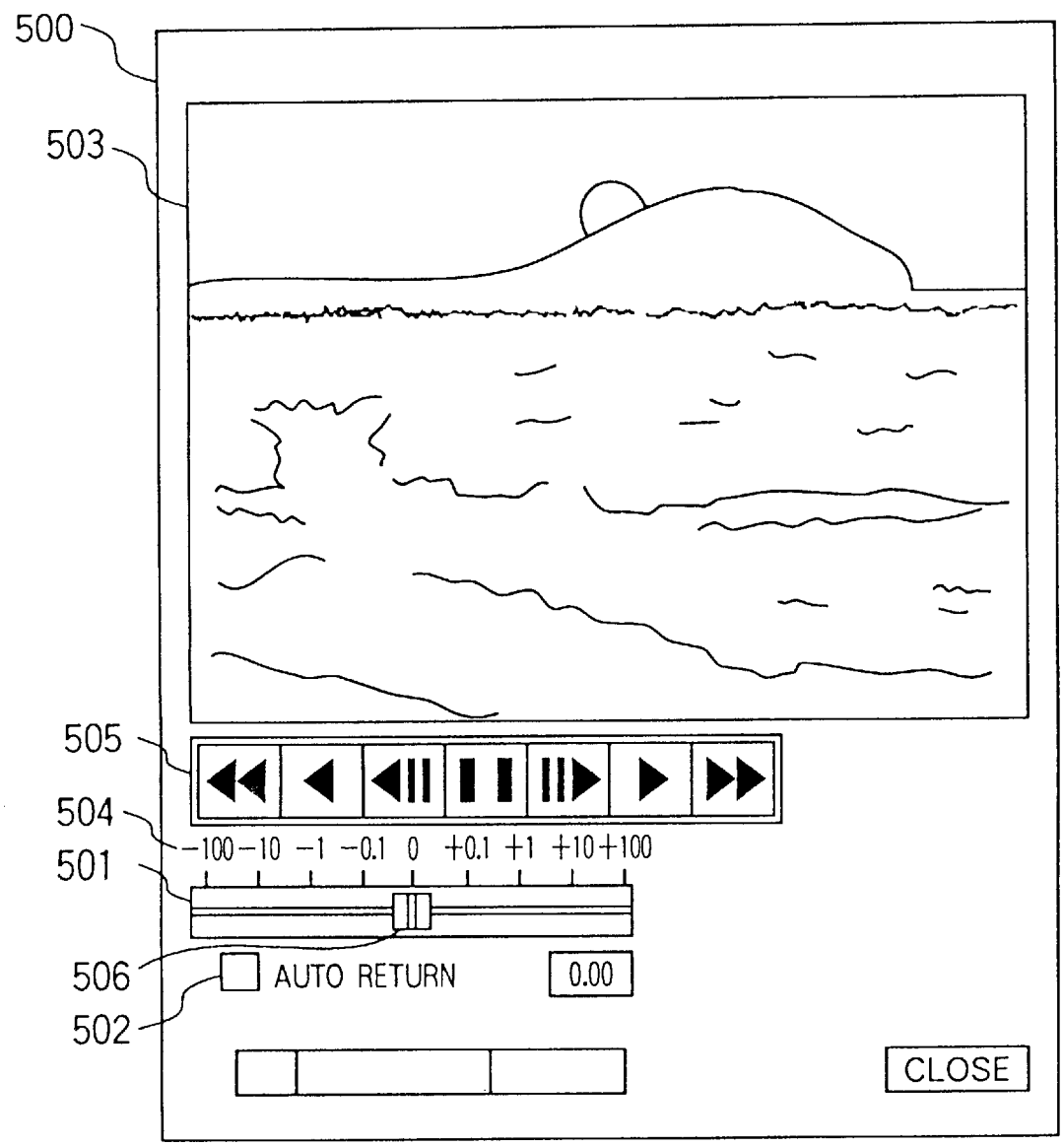
FIG. 6 is a preview window in a motion image editing apparatus using a motion image controlling method in accordance with an embodiment of the present invention.

When the operator selects a desired scene with use of such an instruction device as a mouse or keyboard and selects the preview function, such a preview window 500 as shown in FIG. 6 appears on the display screen, and the motion image of the scene is reproduced and displayed on an image display area 503 above the preview window 500. FIG. 6 will be later explained in detail.

Figure 1:
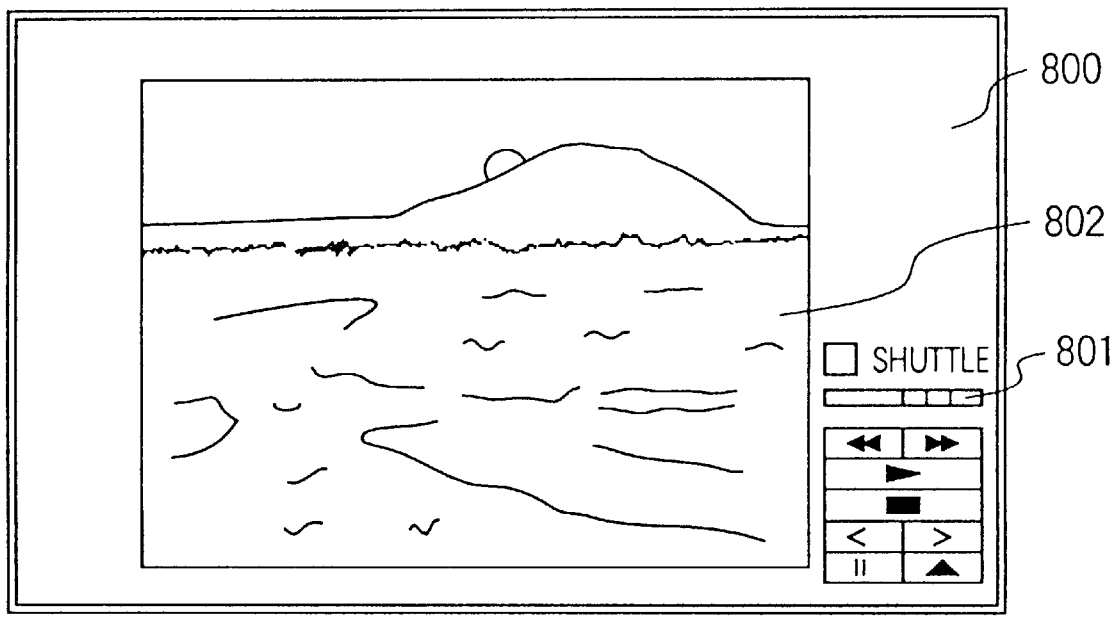
FIG. 1 shows a preview window in a motion image editing apparatus using a prior art motion image controlling method.
Figure 2:
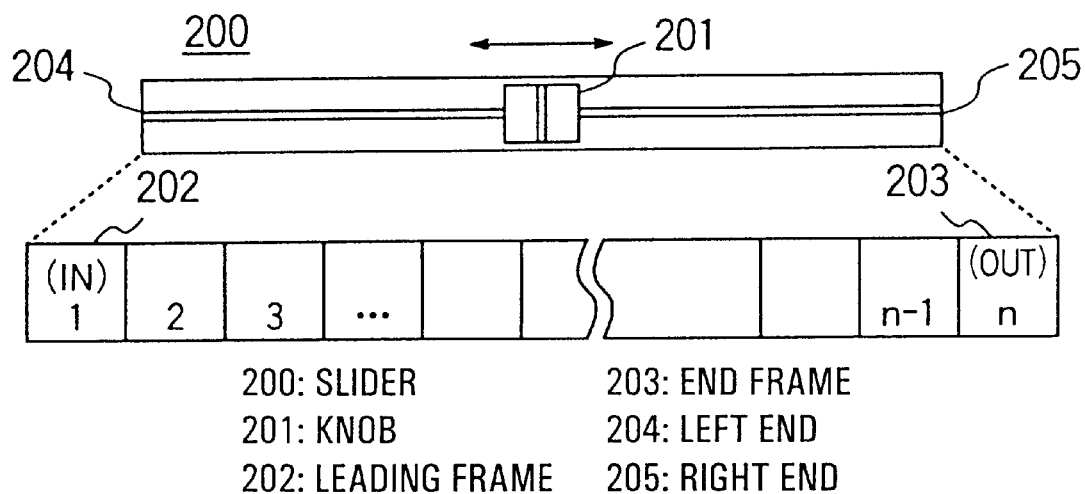
FIG. 2 is a diagram for explaining a slider used in the prior art motion image controlling method and a function of the slider.
Figure 3:
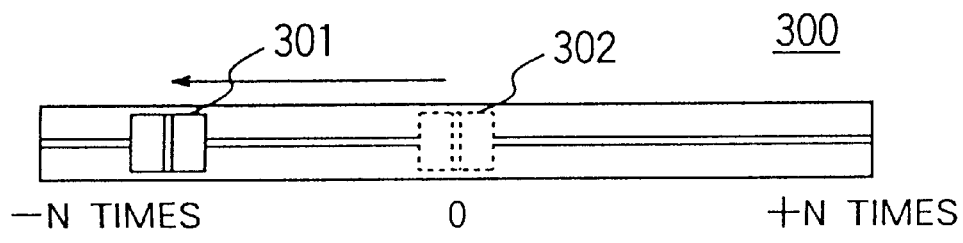
FIG. 3 is a diagram for explaining a slider used in a not known motion image controlling method which the present inventors have examined and a function of the slider.
Figure 4:
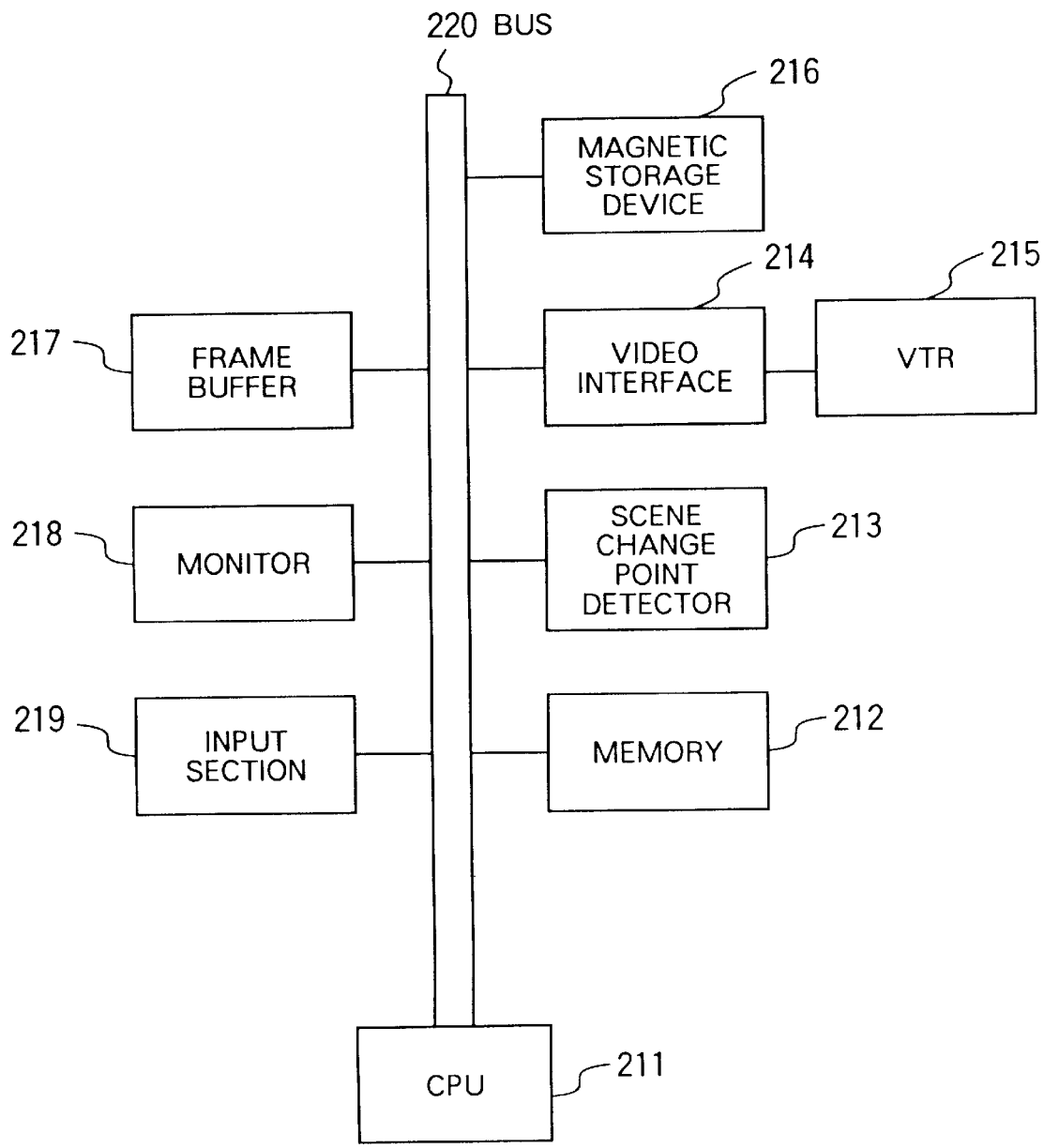
FIG. 4 is a block diagram of an arrangement of a motion image editing apparatus in accordance with an embodiment of the present invention.

Shown in FIG. 4 is an arrangement of a motion image editing apparatus in accordance with an embodiment of the present invention, which includes a CPU 211, a memory 212, a scene change point detector 213, a video interface 214, a video tape recorder (VTR) 215, a magnetic storage 216, a frame buffer 217, a monitor 218, an input section 219, and a bus 220. The memory 212, scene change point detector 213, video interface 214, magnetic storage 216, frame buffer 217, monitor 218 and input section 219 are connected to the CPU 211 through the bus 220. The VTR 215 is connected to the video interface 214.

In FIG. 4, the VTR 215 reproduces video information containing a series of motion images and sounds corresponding to a plurality of scenes from a video tape already inserted therein. The video interface 214 inputs the video information from the VTR 215, converts it to motion-image formatted data, and then applies the data to the magnetic storage 216 through the bus 220. At this time, the motion images are supplied on a frame basis from the VTR 215 to the scene change point detector 213 through the video interface 214 and bus 220. The monitor 218, which is, e.g., a CRT display unit, displays thereon a scene to be edited and cut and edit states. The frame buffer 217 stores the image to be displayed on the monitor 218. The scene change point detector 213 inputs the received motion images, analyzes color information between the images, and detects a part in the scene at which the color information remarkably changes as a scene change point. The scene change point is used to find a scene or cut necessary for image editing. The magnetic storage 216 stores therein, in addition to the aforementioned series of motion images corresponding to a plurality of scenes, a frame number describing the change point, motion image information indicative of a high-speed display image file name, and a high-speed display motion image. At this time, when the operator wants to see as soon as possible the entire motion image of a plurality of frames or the respective divided scenes, the high-speed display motion image reduced in conformity with a size to be displayed is displayed within the high-speed display window.

Figure 5:
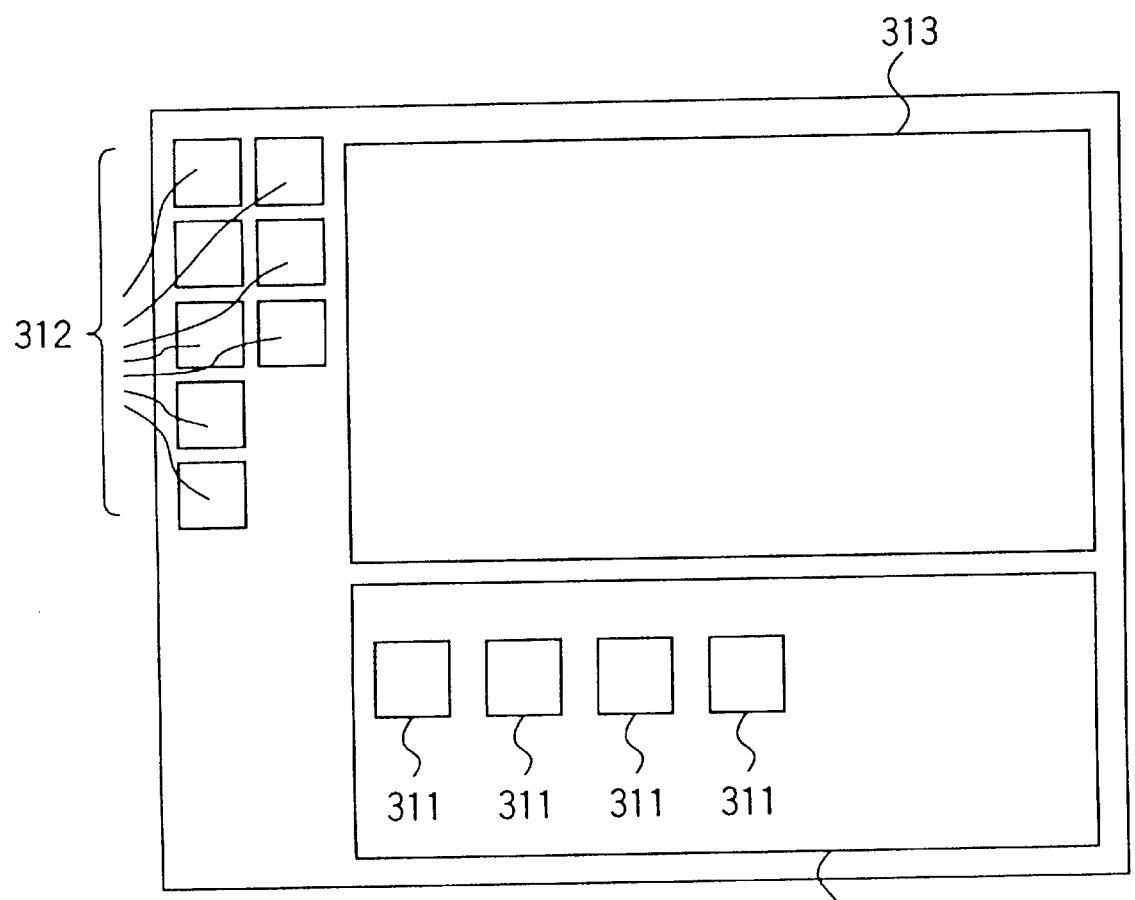
FIG. 5 shows an example of edit screen display of the motion image editing apparatus of FIG. 4.

FIG. 5 shows an example of editing screen appearing on the monitor 218 of the motion image editing apparatus, which includes a high-speed display window 310, high-speed display motion images (moving icons, which will be referred to as the M-icons, hereinafter) 311, various sorts of function buttons 312, and an editing area 313. As shown in FIG. 5, Each M-icon 311 reduces the associated representative image of the high-speed display and cut in conformity with the picture size (for example, 80×60 pixels) and then displays it on the window. The function buttons 312 are provided for the operator conduct various sorts of functional operations on the display screen, and the editing area 313 is used for various sorts of editing operations. The screen of FIG. 5 is of a graphic user interface (GUI) type. On this GUI screen, the operator conducts such editing operation of the motion image as an instruction of high-speed output of the motion image with use of such a pointing device as a mouse or keyboard of the input section 219. When the high-speed output of the motion image is instructed by the input section 219, the CPU 211 continuously reads out the images of the cut and high-speed output from the magnetic storage 216 and then displays them on the monitor 218.

When the above operations are carried out, the CPU 211 sends an access signal to the memory 212, scene change point detector 213, video interface 214, magnetic storage 216 and frame buffer 217 through the bus 220 for various sorts of control. The memory 212 stores therein various control programs of the CPU 211.

The above motion image editing apparatus can automatically divide a motion image on a cut-unit basis, can store and manage the motion image in units of scene and cut, and can easily search for a necessary scene or cut. In addition, the apparatus also can easily edit the motion image on a scene unit basis and a cut-unit basis, thereby lightening operator's working burden.

A means for detecting a change point in an input motion image on the basis of the magnitude of change between frames is disclosed in, e.g., JP-A-2-184181 wherein illumination, sound volume or color tone between the images is analyzed to detect a remarkably changed part as a change point.

With use of the motion image editing apparatus having such an arrangement as shown in FIG. 4, when the operator selects desired scenes and conducts their editing operations, he not only specifies how to connect one scene to another but also does a bit of trimming to specify a part of the scene to be actually used and also applies such special effects as wipes and dissolves to provide a change a transition between the scenes. When wanting to conduct such an editing operation as the above trimming, the operator operates jog and shuttle functions while reproducing the image to repeat the reproduction thereof many times in forward and backward or reverse directions and to specify a target editing point while looking at the editing point reproduced. In this way, in order that the operator can quickly find the target editing point (frame for trimming), the video reproduction window is provided with frame-advance and fast-forward buttons and a shuttle function.

The jog function refers to a function of reproducing an image on a frame-by-frame basis with respect to a predetermined angular rotation; while, the shuttle function refers to a function of reproducing an image at a reproduction rate corresponding to a displacement angle from a start point.

Explanation will next be made as to an embodiment wherein the shuttle function is implemented so that a slider indicator is provided with an origin in the mid-point thereof, and when a knob is located at any point within a predetermined range including the origin, the knob is automatically returned to the origin position to stop the motion image display; whereas, when the knob is released outside of the determined range including the origin, the knob stays still at the moved position and the motion image display is carried out at a set reproduction rate.

An example of the shuttle function in the motion image display method of the present invention will now be explained.

FIG. 6 shows a preview window 500 which includes an image display area 503, a group of pushbutton switches 505 for controlling the reproduction state of a motion image to be reproduced on the image display area 503, and a slider 501 for implementing a function of being able to change the reproduction rate of the motion image both in the forward and reverse directions.

According to the shuttle function in the motion image display method of the present invention, when the operator puts a cursor of the mouse on a knob 506 located in the mid-point of the slider 501 at the time of the first preview window display (at the time of starting the preview) or at the time of the still motion image display, and then clicks or drags to left or right (for example, in the forward direction from the center to the right), this causes the image to be reproduced at a preset reproduction rate.

With respect to the reproduction rate, when reproduction rates of 0 to n are set on a logarithmic scale 504, a wide range of reproduction rate can be represented.

Figure 7:
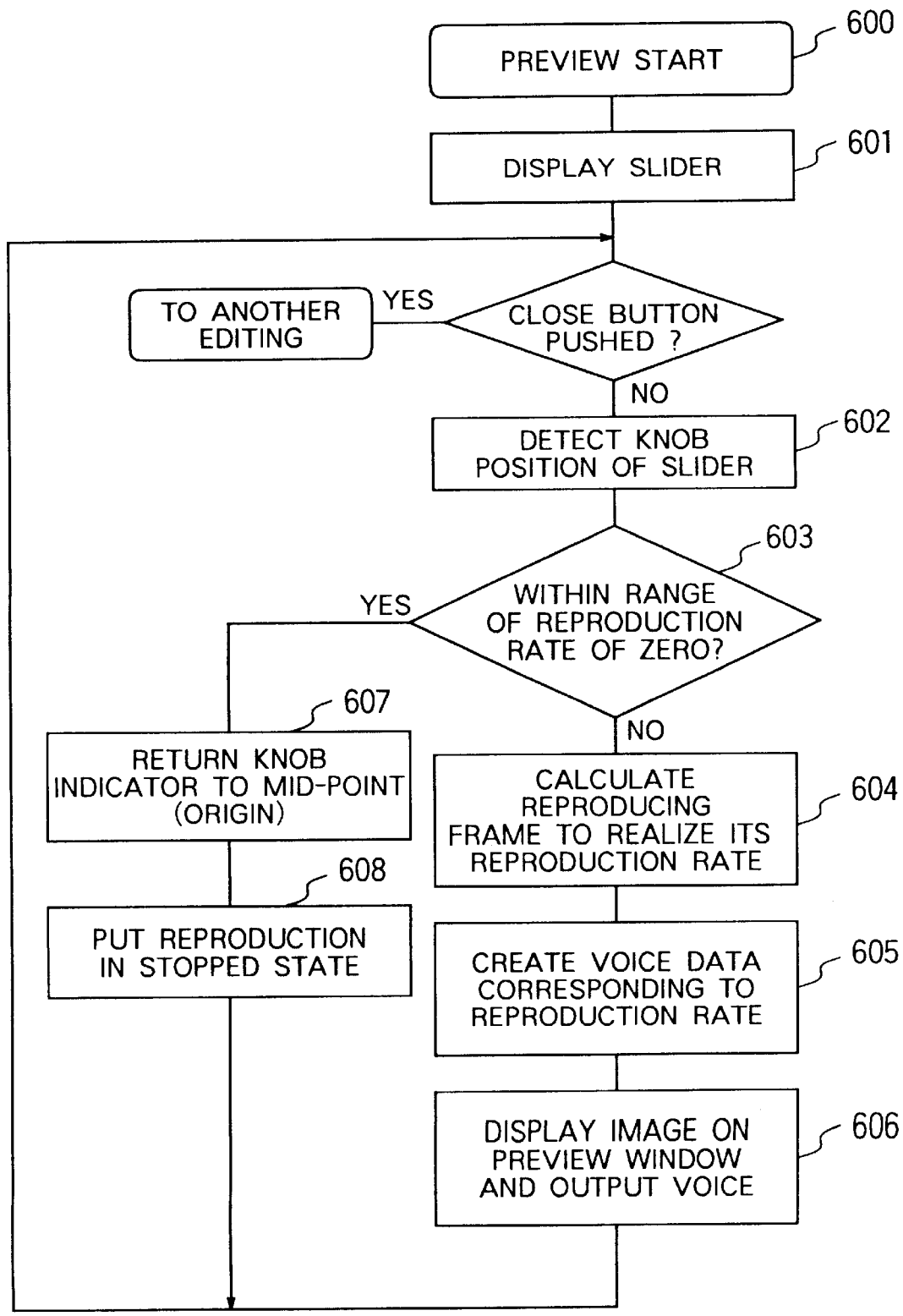
FIG. 7 is a flowchart for implementing a shuttle function of a preview window in a motion image editing apparatus using a motion image controlling method in accordance with another embodiment of the present invention.

Explanation will then be made in detail as to the above shuttle function by referring to a flowchart of FIG. 7 explaining the operation of the shuttle function. In this connection, a program for implementing the flowchart of FIG. 7 may be stored in such a medium as readable by a computer.

As shown by the flowchart in FIG. 7, when a preview start (refer to a step 600) function is called, the group of pushbutton switches 505 for reproduction and the slider 501 appear on the display (refer to a step 601), and the leading frame of the image appears in the image display area 503.

When the operator now clicks the knob 506 located in the mid-point of the slider 501 and drags it with use of the mouse, the CPU detects the then amount (i.e., a displacement of the knob 506 from the mid-point) of displacement in the mouse (refer to a step 602), calculates a sequence of frames to be used for reproduction so that the image can be reproduced at a preset reproduction rate corresponding to the displacement amount (refer to a step 604), and then outputs data on the basis of its calculated result (refer to a step 606).

The frame calculation is assumed in this case to be carried out in such a manner as to determine, when reproduction is carried out at a rate equal to the normal rate or less, whether an identical frame is to be output how many times or the next frame is to be output at constant intervals.

Conversely, when reproduction is carried out at a rate exceeding the normal rate, a desired reproduction rate may be realized by cutting data of several frames on a several-frames basis and outputting the remainder.

In the reproduction of this case, even when the knob 506 is clicked and dragged with use of the mouse or even when the knob 506 is released from the dragged position, the knob 506 can be displayed at the dragged position and the reproduction can be continued at a reproduction rate of the moved position.

Due to this function, the mouse function can be released from the operation of the slider 501. Thus, such another function using the mouse can be created of, for example, setting a trimming IN/OUT point with use of the mouse.

Further, even when the operator sets the IN/OUT point through the keyboard in the preview mode, he can conduct its operation without paying any attention to the mouse operation.

Furthermore, when the operator wants to carry out the reproduction at another reproduction rate, he is only required to move the knob 506 to its specified position with use of the mouse.

When the operator wants to stop (halt) the reproduction, the reproduction can be stopped (halted) by clicking a stop pushbutton in the group of pushbutton switches 505 or returning the knob 506 of the slider 501 to the mid-point position (a position 0 on the logarithmic scale 504).

In the prior art, however, when it is desired for the operator to put the knob 506 on its mid-point position, it has required a considerable level of handling proficiency, since no mechanical click or scratch (stopper) to indicate the fact that the knob is returned to the origin as in a shuttle dial in video tape recorders is provided.

Figure 8:
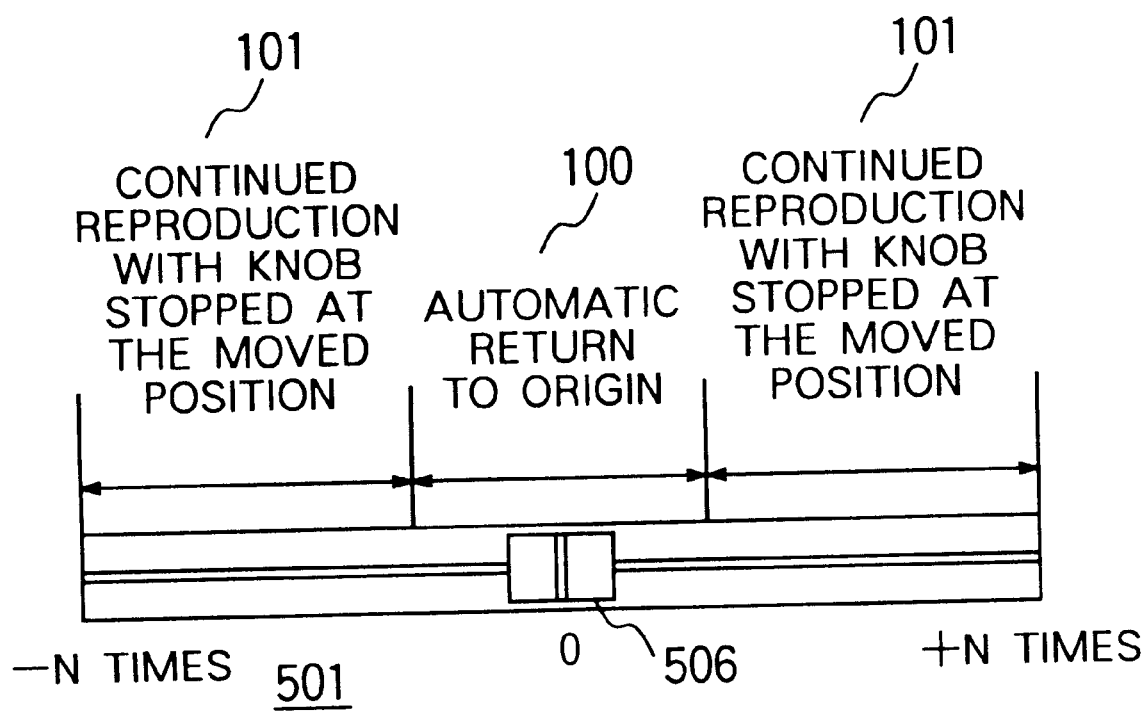
FIG. 8 is a diagram for explaining a slider used in the motion image controlling method of the present invention and a function of the slider.

To avoid this, the shuttle function of the motion image display method of the present invention is provided with such a function of, when the position of the knob 506 moved by the mouse is detected and as a result of it, when the knob 506 is moved into a position within a certain range 100 including the preset origin position as shown in FIG. 8 (refer to a step 607); of automatically returning the knob 506 to the origin 0 and at the same time of stopping (halting) the reproduction (refer to a step 608).

This function enables the operator to remarkably eliminate the troublesome labor of putting the knob on the origin.

Further, when the aforementioned certain range is expanded over the entire slider, the knob can be automatically returned to the mid-point of the slider from a given position.

Figure 9:
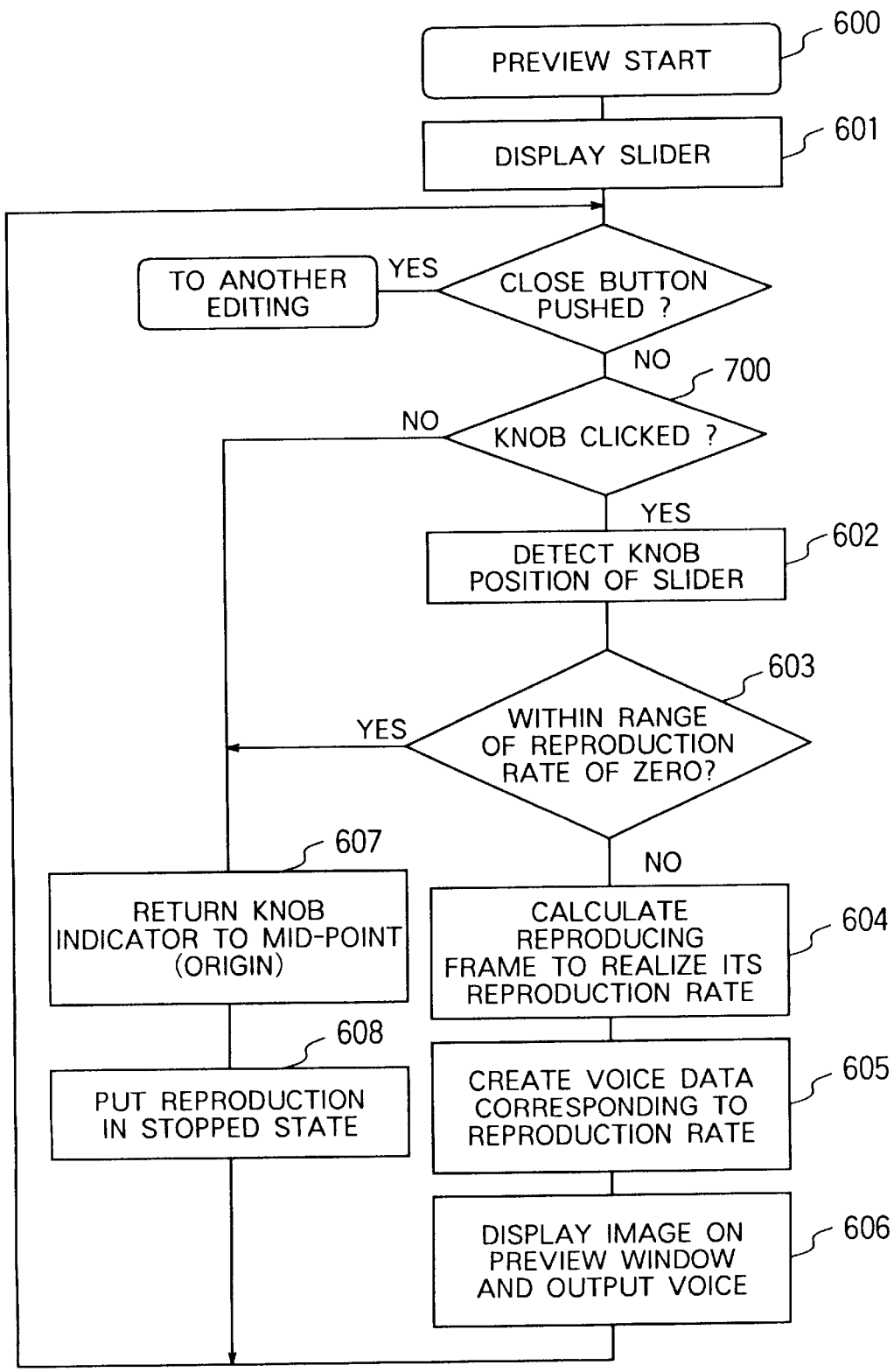
FIG. 9 is a flowchart for implementing a shuttle function of a preview window in a motion image editing apparatus using a motion image controlling method in accordance with a further embodiment of the present invention.

According to the motion image controlling method of the present invention, as shown by a flowchart in FIG. 9, such a function may be further added of monitoring a clicked state of the pushbuttons of the mouse, reproducing the image at the reproduction rate in question only during the continuously clicked time at the moved position of the knob 506 (step 700) and when the operator releases the knob, of automatically return the knob to the origin 0 from a given position in the entire range of the slider 501 to put the apparatus in its stopped state. In this connection, a program for implementing the flowchart of FIG. 8 may be stored in such a medium as readable by a computer.

When this shuttle function is employed, searching for a desired frame can be easily realized by repeating the image in small frame increments or decrements.

Further, since the above two functions are designed so as to be alternately switched by clicking an auto return pushbutton switch 502, the operation can easily use the shuttle function according to the circumstances.

It goes without saying that the aforementioned shuttle function of the present invention can be applied not only to the operator's confirmation of the scene being edited (or already edited) based on the preview but also to control of the video tape recorder connected with the monitor.

In accordance with the present embodiment, on the editing window, the origin is provided at the mid-point of the slider or in the vicinity thereof, the knob located at any position within the predetermined range extening right and left equally from the origin positioned at the mid-point of the range is automatically returned to the origin to provide a reproduction rate of zero and to stop the motion image display or to put it in its still state, and when the knob is located outside of the predetermined range, the knob stays still at the moved position to provide the motion image display at the reproduction rate set for the position. Further, there is provided a motion image control method and apparatus which can alternately switch between the above function and the function of returning the knob to the origin from all points upon release of the knob.

In the foregoing embodiment, in the case where the preview window 500 is displayed as shown in FIG. 6 or in the case where the motion image display is still, when the operator puts the mouse cursor on the knob 506 located at the mid-point of the shuttle-function setting slider 501, clicks or drags it to the left or right side of the slider 501, this causes the image to be reproduced at the reproduction rate preset for a moved distance of the knob from the mid-point to the moved position.

In this case, however, in order to reproduce the motion image at a desired reproduction rate, the operator is required to move the knob to a position corresponding to the target reproduction rate.

For this reason, in the shuttle function of the foregoing embodiment, it is impossible for the operator to reproduce the motion image at a desired reproduction rate immediately from after the start of the reproduction.

Another embodiment to be explained below is arranged so that the operator can specify a desired reproduction rate on an image reproduction window showing a reproduction rate of a motion image and can quickly reflect the set contents. The present embodiment will be explained by referring to FIGS. 4, 5, 6, 10 and 11.

Explanation will be made in connection with an example where an operator edits a photographed image using a motion image editing apparatus having the same arrangement as shown in FIG. 4.

In FIG. 5, for the purpose of confirming contents of an image contained in each scene, when the operator selects one of the displayed M-icons 311 and then clicks the preview button in the group of function buttons 312, the preview function causes the CPU 211 to read out only the first frame from the corresponding motion image, whereby such a motion image as shown in FIG. 6 appears as reproduced on the monitor 218 and thus the operator can confirm the contents while looking at the displayed image. The preview function refers to a function of reproducing on a display a result of an image being edited or already edited, on the basis of which an operator can confirm the edited contents while looking at the displayed image.

Figure 10:
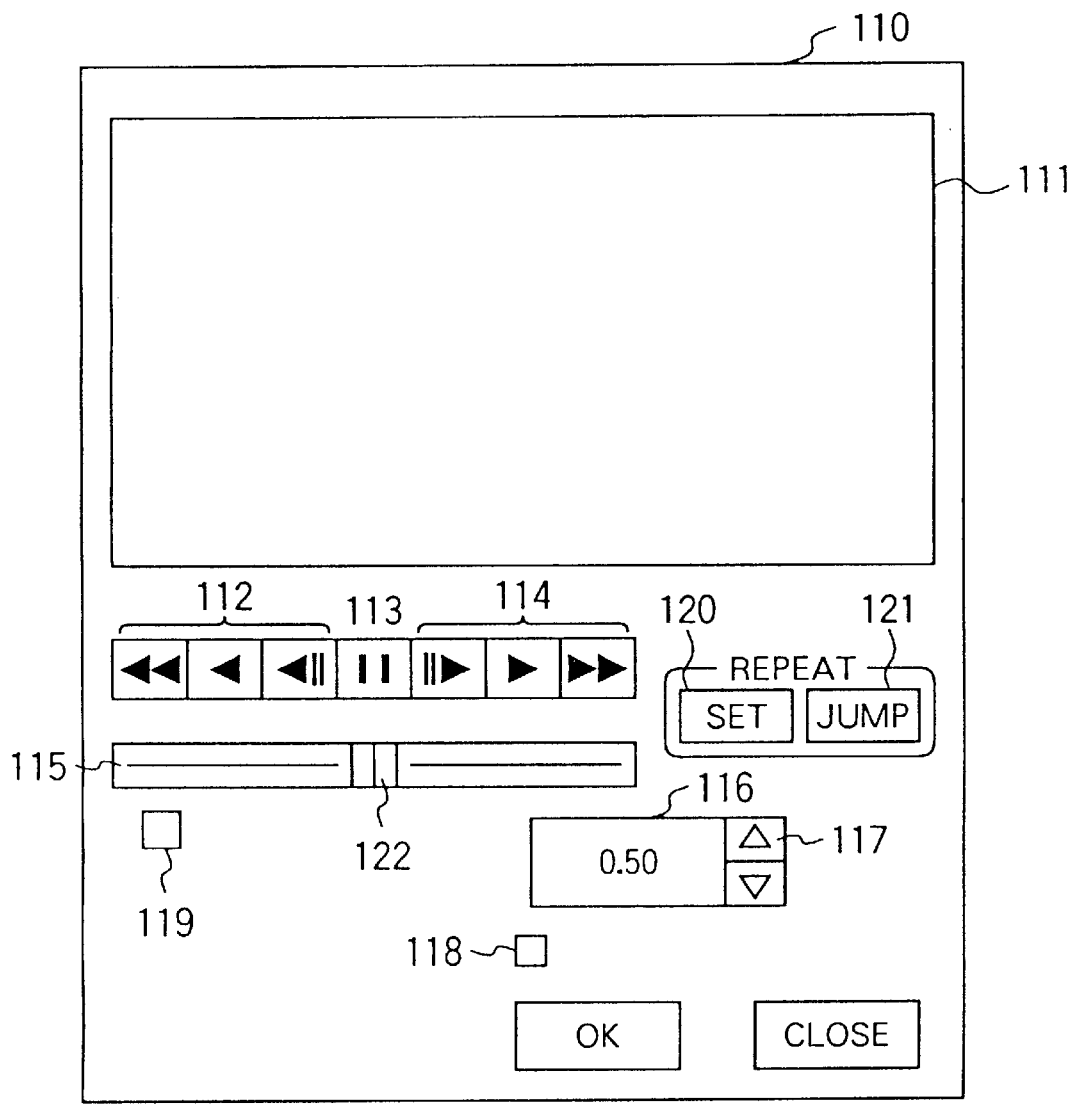
FIG. 10 shows an example of a reproduction image display window in a motion image editing apparatus in accordance with another embodiment of the present invention.

FIG. 10 shows an example of image reproducing window in the motion image editing apparatus of the present embodiment, which includes a reproduced image display window 110, a display/reproduction window 111, a group of reproduction buttons 112, 113 and 114, a shuttle-function setting slider 115, a reproduction rate display window 116, a reproduction rate change button 117, a linkage button 118, an origin return button 119, a set button 120, a jump button 121, and a shuttle-function setting knob 122.

In FIG. 10, when the operator clicks the group of reproduction buttons 112, 112 and 114 to provide forward/reverse reproduction, frame advance, and fast forward; whereas, when the operator moves the shuttle-function setting knob 122 of the shuttle-function setting slider 115 to left or right (in the forward or reverse direction) to provide slow reproduction fast-forward reproduction.

Further, the reproduction rate when the shuttle-function setting slider 115 is used is displayed on the reproduction rate display window 116, and the operator sets it at a desired reproduction rate while confirming the displayed value. However, it is difficult for him quickly to set at a desired reproduction rate (to move knob) (from a target frame).

To avoid this, the present embodiment is provided with a function of allowing the operator to enter a reproduction rate in the reproduction rate display window 116, is provided with the reproduction rate change button 117 with which the operator can adjust or finely adjust the reproduction rate and is also provided with the linkage button 118 with which the operator can designate whether or not to link the changed result with the reproduction rate.

If the linkage button 118 is previously depressed, then the reproduction rate is changed immediately after depression of the reproduction rate change button 117 or immediately after entering of the reproduction rate from the keyboard of the input section 219 and then depression of the OK key (for example, the OK key is ENTER key or RETURN key on the keyboard of the input section 219). When the linkage button 118 is not previously pushed, operator's depression of the linkage button 118 after depressing the reproduction rate change button 117 or after entering the reproduction rate from the keyboard of the input section 219 and then depressing the OK key will cause the reproduction rate to be changed.

In this connection, the reproduction is continuously carried out at the aforementioned rate until the reproduction stoppage is specified or another reproduction rate is set.

At this time, the shuttle-function setting knob 122 is also moved already to a position corresponding to the above set reproduction rate and subsequently the reproduction rate may be changed utilizing the shuttle function. When the origin return button 119 is now selected, operator's release of the shuttle-function setting knob 122 of the shuttle causes the knob to be automatically returned to (stopped at) the origin (the mid-point of the shuttle). Accordingly, this function can eliminate the operator's additional troublesome labor to stop the reproduction.

Figure 11:
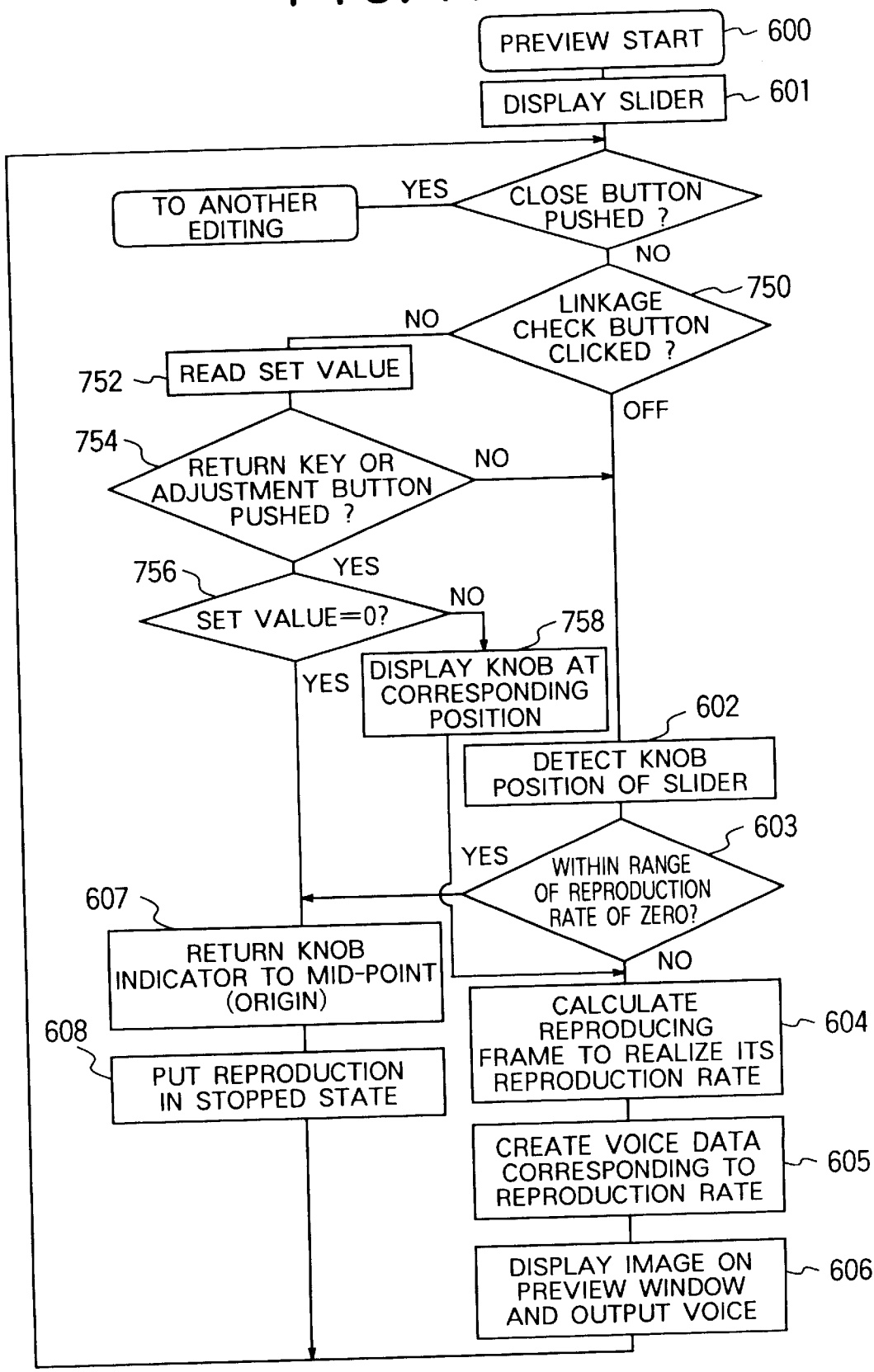
FIG. 11 is a flowchart for implementing a shuttle function in yet another embodiment of the present invention.

More specifically, as shown by a flowchart by FIG. 11, the CPU checks whether or not the linkage check button 118 was clicked (step 750). When the linkage button was clicked, the CPU reads and takes in a set value on the reproduction rate display window 116 (step 752). And the CPU judges whether the OK button was depressed for the set value or the set value was entered by the reproduction rate change button 117 (step 754). If YES, then the CPU judges whether or not the set value is zero (step 756). If the set value is not zero, then the CPU moves the shuttle-function setting knob 122 to a position corresponding to the set value (step 758). The CPU sequentially executes steps 604, 605 and 606 to display an associated image on the preview window and to issue an associated sound. When determining at the step 756 that the set value is zero, the CPU returns the knob 122 to the origin position (step 607) to put the reproduction in the still state (step 606). In this connection, a program for implementing the flowchart of FIG. 11 may be stored in a computer readable medium.

Figure 12:
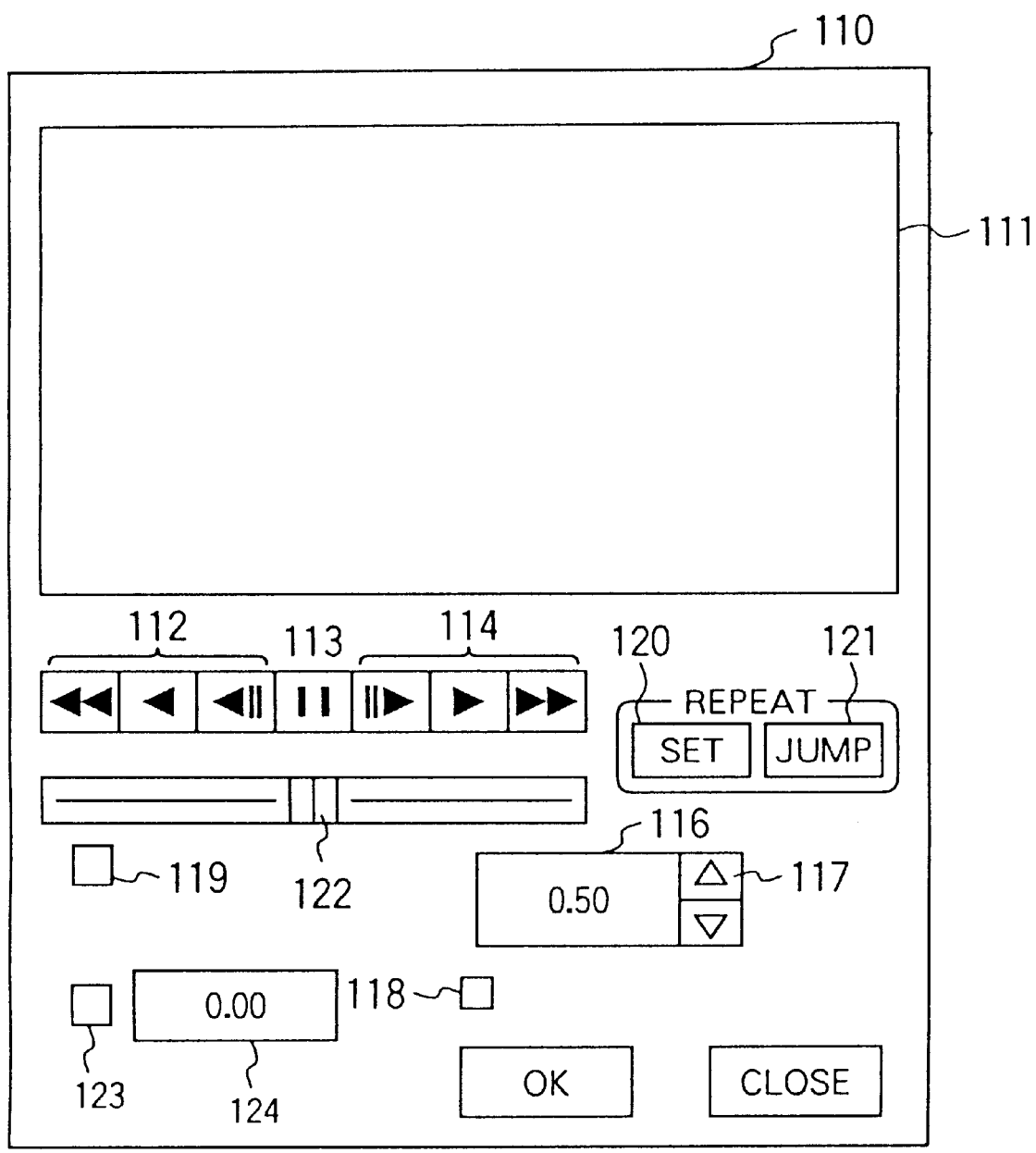
FIG. 12 shows an example of a reproduction image display window in yet another embodiment of the present invention.

Shown in FIG. 12 is a diagram for explaining a shuttle function in a further embodiment of the present invention, in which a reproduction initial value display window is provided to the image production window of the motion image editing apparatus of FIG. 10.

Figure 13:
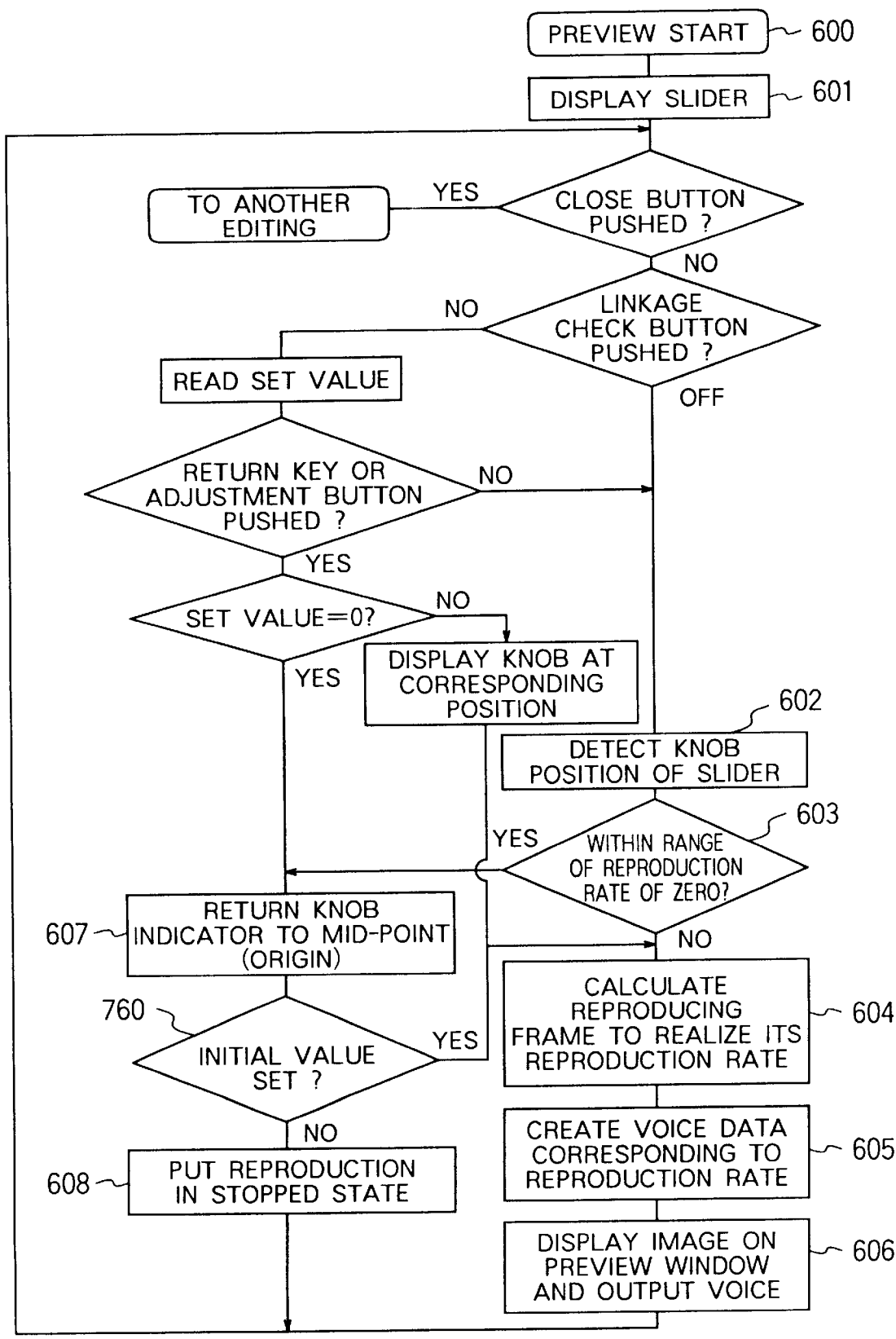
FIG. 13 is a flowchart for implementing a shuttle function in the embodiment of FIG. 12.

In FIG. 12, reference numeral 123 denotes a reproduction initial value set button, and 124 denotes a reproduction initial value display window. FIG. 13 is a flowchart for explaining a procedure of executing the shuttle function of the present embodiment. In this connection, a program for implementing the flowchart may be stored in a computer readable medium.

In FIG. 13, when the shuttle knob 122 is returned to the middle constant range (origin) of the slider 115 (step 607), the CPU judges whether or not a reproduction initial value is set in the reproduction initial value display window (step 760). If the reproduction initial value is set, then the associated motion image and sound are reproduced a reproduction rate corresponding to the set initial value (steps 604, 605 and 606). If not, then the reproduction is stopped or put in the still state (step 608).

Figure 14:
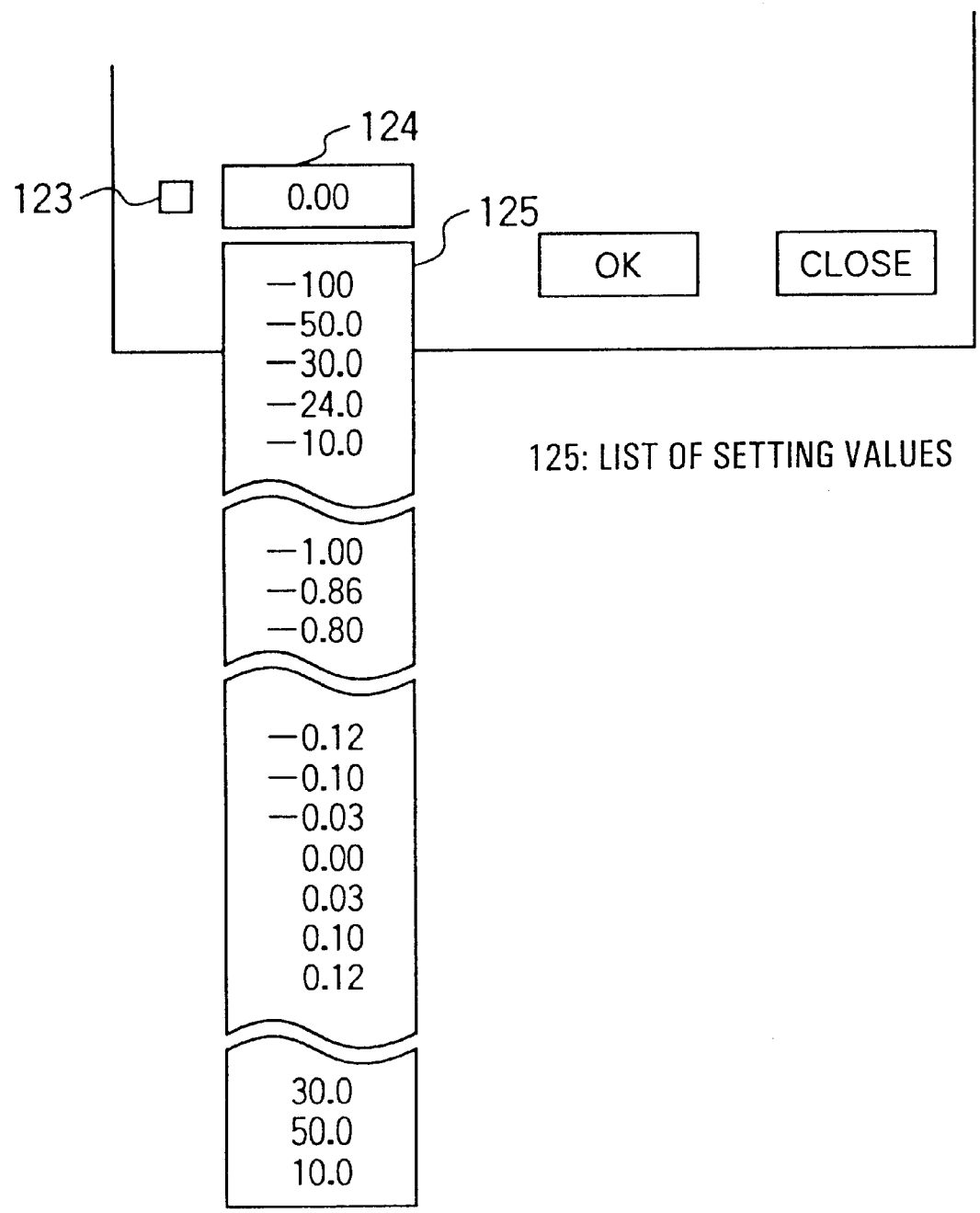
FIG. 14 shows an exemplary list of reproduction initial values used in association with the display window of FIG. 13.

In this connection, setting of the reproduction initial value may be carried out not only by entering it from the keyboard but also, for example, by clicking the reproduction initial value display window 124 with use of the mouse to display such a list 125 of settable values as shown in FIG. 14 and then selecting one of the values in the list. The selected value is displayed in the reproduction initial value display window 124.

In the editing operation, in order to provide edit special effects, there is often used a technique for providing a slow reproduction for a specific frame or providing a reverse-directional reproduction. The present invention is effective when the operator wants to previously confirm such editing effects. More specifically, the operator specifies a leading frame to which the special effects are to be applied (of course, even for which operation, the function of the present invention is effective) and clicks the set button 120. The operator then specifies a reproduction rate and pushes the reproduction button 112 or 114. Thus, the operator can confirm the evaluation of the edit effects by looking at the reproduced image.

When the operators wants to reproduce the image at another reproduction rate, he pushes the jump button 121, which results in that the image is moved up to a frame set by the set button 120. Thereafter, the operator similarly repeats the setting of the reproduction rate and the reproduction to advance the editing of the motion image while confirming the edited state.

In this way, by using the function of being capable of specifying the reproduction rate, the operator can easily know the most suitable reproduction rate for the most effective editing. In this conjunction, the magnetic storage 216 may be replaced by another memory medium such as a MO disk memory device or a remote file through a network, which will be readily appreciated.

As a result, the operator can reproduce a motion image at a target reproduction rate immediately after the reproduction of the motion image, can create effective editing effects such as searching for a editing point, slow reproduction or reverse reproduction by try and error, and can realize effective improvement of special effect creation at the time of editing.

What is claimed is:

1. A motion image control apparatus comprising:

means for recording and reproducing video information including video and voice data;

means for displaying the video information reproduced by said recording/reproducing means:

an operational control indicator including slider and knob indicators for instructing a reproduction rate of the motion image, displayed on said display means, together with a motion image reproduced by said recording/reproducing means:

a reproduction rate display area displayed on said display means for indicating therein said reproduction rate of the motion image varying depending on a relative position of said knob indicator relative to said slider indicator; and means for changing a value displayed in said reproduction rate display area and setting a reproduction rate corresponding to a changed value, wherein a linkage button indicator is provided on said display means and, when said linkage button indicator is made active and the value displayed in said reproduction rate display area is changed, said knob indicator of said slider indicator is moved as interlinked with display of said reproduction rate display area.

2. A motion image control comprising:

means for recording and reproducing video information including video and voice data;

means for displaying the video information reproduced by said recording/reproducing means;

an operation control indicator including slider and knob indicators for instructing a reproduction rate of the motion image, displayed on said display means, together with a motion image reproduced by said recording/reproducing means;

a reproduction rate display area displayed on said display means for indicating therein said reproduction rate of the motion image varying depending on a relative position of said knob indicator relative to said slider indicator;

a button indicator displayed on said display means for adjusting said reproduction rate; and means for setting a reproduction rate according to a value changed by said button indicator and displayed in said reproduction rate display area, wherein a linkage button indicator is provided on said display means, and when said linkage button indicator is made active and the value displayed in said reproduction rate display area is changed, said knob indicator of said slider indicator is moved as interlinked with display of said reproduction rate display area.

3. A motion image control apparatus comprising:

means for recording and reproducing video information including video and voice data;

means for displaying the video information reproduced by said recording/reproducing means;

an operational control indicator including slider and knob indicators for instructing a reproduction rate of the motion image, displayed on said display means, together with a motion image reproduced by said recording/reproducing means;

a reproduction rate display area displayed on said display means for indicating therein said reproduction rate of the motion image varying depending on a relative position of said knob relative to said slider;

a set button indicator displayed on said display means for specifying a leading frame; and a jump button indicator displayed on said display means for jumpingly moving to a frame set by said set button.

4. A motion control apparatus comprising:

means for recording and reproducing video information including video and voice data;

means for displaying the video information reproduced by said recording/reproducing means;

an operation control indicator including slider and knob indicators for instructing a reproduction rate of the motion image, displayed on said display means, together with a motion image reproduced by said recording/reproducing means;

a reproduction rate display area displayed on said display means for indicating therein said reproduction rate of the motion image varying depending on a relative position of said knob indicator relative to said slider indicator;

a button indicator displayed on said display means for adjusting said reproduction rate; and means for setting a reproduction rate according to a value changed by said button indicator and displayed in said reproduction rate display area, wherein a linkage button indicator is provided on said display means and, when said linkage button indicator is made active and the value displayed in said reproduction rate is instantly changed and said knob indicator of said slider indicator is moved as interlinked with display of said reproduction rate display area.

5. A motion image control apparatus comprising:

a unit for recording and reproducing video information including video and voice data;

a unit for displaying the video information reproduced by said recording/reproducing unit;

an operational control indicator including slider and knob indicators for instructing a reproduction rate of the motion image, displayed on said display unit, together with a motion image reproduced by said recording/reproducing unit;

a reproduction rate display area displayed on said display unit for indicating therein said reproduction rate of the motion image varying depending on a relative position of said knob relative to said slider; and an input section for setting a reproduction rate and inputting it in said reproduction rate display area as a numeral value.

6. A motion image control apparatus comprising:

a unit for recording and reproducing video information including video and voice data;

a unit for displaying the video information reproduced by said recording/reproducing unit;

an operational control indicator including slider and knob indicators for instructing a reproduction rate of the motion image, displayed on said display unit, together with a motion image reproduced by said recording/reproducing unit;

a reproduction rate display area displayed on said display unit for indicating therein said reproduction rate of the motion image varying depending on a relative position of said knob relative to said slider;

a button indicator displayed on said display unit for adjusting said reproduction rate; and means for setting a reproduction rate according to a value changed by said button and displayed in said reproduction rate display area.

7. A motion image control apparatus according to claim 5, wherein a linkage button indicator is provided on said display unit and, when said linkage button indicator is made active and the value displayed in said reproduction rate display area is changed, said knob indicator of said slider indicator is moved as interliked with display of said reproduction rate display area.

8. A motion image control apparatus comprising:

a unit for recording and reproducing video information including video and voice data;

a unit for displaying the video information reproduced by said recording/reproducing unit;

an operational control indicator including slider knob indicators for instructing a reproduction rate of the motion image, displayed on said display unit, together with a motion image reproduced by said recording/reproducing unit;

a reproduction rate display area displayed on said display unit for indicating therein said reproduction rate of the motion image varying depending on a relative position of said knob relative to said slider;

a set button indicator displayed on said display unit for specifying a leading frame to which an editing special effect is applied; and a jump button indicator displayed on said display unit for jumpingly moving to a frame set by said set button.

9. A motion image control apparatus according to claim 6, wherein a linkage button indicator is provided on said display unit and, when said linkage button is made active and the value displayed in said reproduction rate display area is changed, said knob indicator of said slider indicator is moved as interliked with display of said reproduction rate display area.

10. A motion image control apparatus according to claim 5, wherein a predetermined range of said slider indicator is set as a first motion image reproduction rate range, a range of the slider other than said first motion image reproduction rate range is set as a second motion image reproduction rate range, and the reproduction rate of said motion image is changed depending on a position of said knob in said first and second motion image reproduction rate range.

11. A motion image control apparatus according to claim 10, further comprising a window on said display unit for allowing setting of said reproduction rate when said knob is positioned in said first motion image reproduction rate range.

12. A motion image control method used in a motion image control apparatus having a unit for recording and reproducing video information including video and voice data and a unit for displaying the video information reproduced by said recording/reproducing unit, said method comprising the steps of:

displaying on said display unit at least a motion image reproduced by said recording/reproducing unit, an operational control indicator including a slider indicator and a movable knob indicator for instructing a reproduction rate of the motion image, a reproduction rate display area for displaying therein said reproduction rate, and a linkage button indicator;

checking an ON or OFF state of said linkage button indicator;

when said linkage button is in the OFF state, changing said reproduction rate according to a position of said knob on said slider;

when said linkage button is in the ON state, checking whether or not the reproduction rate indicated in said reproduction rate display area is a acknowledged value or not; and when the reproduction rate is the acknowledged value, moving said knob to a corresponding position on said slider to reproduce said motion image at a reproduction rate corresponding to the determined value.

13. A motion image control method according to claim 12, further comprising, when said acknowledged reproduction rate is zero, a step of moving said knob indicator to the origin on said slider indicator and a step of setting said reproduction rate at zero.

14. A motion image control method according to claim 12, wherein a predetermined range of said slider indicator is set as a first motion image reproduction rate range and a range of said slider other than said first motion image reproduction rate range is set as a second motion image reproduction rate range, and wherein said step of changing the reproduction rate includes a step of detecting a position of said knob on said slider and a step of changing the reproduction rate of said motion image according to a position of said knob in said first and second motion image reproduction rate ranges.

15. A motion image control method according to claim 14, further comprising, when the position of said knob is located within said first motion image reproduction rate range, a step of automatically moving said knob to a predetermined position.

16. A motion image control method according to claim 15, wherein said predetermined position is the origin of said slider indicator.

17. A motion image control method according to claim 15, further comprising, when said knob is located at said predetermined position, a step of setting said reproduction rate at zero.

18. A motion image control method according to claim 13, wherein a reproduction initial value display area is also displayed on said display unit, and further comprising, when a reproduction initial value is set in said reproduction initial value display area, a step of reproducing said motion image with said reproduction initial value, following said step of moving said knob to said origin.

19. A computer software product including a computer-readable medium, said medium having stored thereon:

computer-readable program code means for displaying on a display unit at least a motion picture reproduced by a unit for recording and reproducing video information including video and voice data, an operational control indicator including slider and movable knob indicators for instructing a reproduction rate of said motion image, a reproduction rate display area for displaying therein said reproduction rate, and a linkage button indicator;

computer-readable program code means for checking an ON or OFF state of said linkage button indicator;

computer-readable program code means, when said linkage button is in its OFF state, for changing said reproduction rate according to a position of said knob indicator on said slider indicator;

computer-readable program code means, when said linkage button is in its OFF state, for checking whether or not the reproduction rate indicated in said reproduction rate display area is an acknowledged value;

computer-readable program code means, when said reproduction rate is the acknowledged one, for moving said knob indicator to a corresponding position on said slider indicator to reproduce said motion image at a reproduction rate indicative of said determined value.

* * * * *